United States Patent [19]

Graham, Jr.

[11] Patent Number: 4,510,757

[45] Date of Patent: Apr. 16, 1985

[54] HEAT ENGINE

[76] Inventor: Merrill E. Graham, Jr., P.O. Box 545, Tehachapi, Calif. 93561

[21] Appl. No.: 567,799

[22] Filed: Jan. 3, 1984

[51] Int. Cl.³ .............................................. F22D 5/00
[52] U.S. Cl. ..................................... 60/667; 60/671; 60/686; 60/690; 415/80
[58] Field of Search ................. 60/650, 651, 665, 667, 60/669, 671, 682, 686, 690; 415/80

[56] References Cited

U.S. PATENT DOCUMENTS

| | | | |
|---|---|---|---|
| 1,272,378 | 7/1918 | Collins | 60/671 |
| 3,495,406 | 2/1970 | Donatelli et al. | 60/669 X |
| 3,911,694 | 10/1975 | Doerner | 60/669 X |
| 4,059,961 | 11/1977 | de la Parra M. | 60/682 X |
| 4,255,934 | 3/1981 | Stephenson | 60/682 X |

*Primary Examiner*—Stephen F. Husar

*Attorney, Agent, or Firm*—Mallinckrodt, Mallinckrodt, Russell & Osburn

[57] ABSTRACT

An engine which can operate satisfactorily on sources of relatively low heat, such as waste heat given off by steam generating plants, includes a heating tank operably positioned with respect to a source of heat so that fluid within the tank is heated. The fluid in the tank is selected so that its boiling point is below the temperature of the heating tank. In this way the fluid is pressurized in the tank. The pressurized fluid flows to a turbine having a hollow central shaft with hollow vanes extending radially therefrom. The pressurized fluid flowing from the ends of the vanes cause the turbine to rotate. A housing about the turbine collects the fluid expelled from the vanes. The fluid then flows through a conditioning means into a storage tank where it is then introduced back into the heating tank to be recirculated. Electronic circuitry is provided to monitor and control operation of the engine.

18 Claims, 7 Drawing Figures

HEAT ENGINE

BACKGROUND OF THE INVENTION

1. Field: The invention is in the field of engines for converting heat, particularly waste heat or solar heat, into rotary motion.

2. State of the Art: There are currently many types of turbines which are powered by heated fluids such as heated air or steam. These engines, however, require very hot fluids and are designed to be used with specific heat sources which produce the high temperature fluids necessary. For example, the steam turbines used to generate electricity are used in conjunction with coal or natural gas boilers which produce the steam, usually superheated, to power the turbine. Atomic reactors are also used to create heated fluid to power turbines. With the high heat content of the fluid used for the turbine, the fluid discharged from the turbine is still very hot. This fluid is usually recirculated, but is cooled before reuse. This cooling procedure wastes much of the heat that was initially put into the fluid. When steam is used in a turbine, the steam from the turbine is usually condensed prior to the water being again heated to produce more steam. The heat given off during condensation is usually wasted.

There is need for an engine which can operate to convert relatively low temperatures into useable energy and make use of the wasted heat from other sources to generate electricity or do other work.

SUMMARY OF THE INVENTION

According to the invention, an engine which operates on the relatively low temperatures available as waste heat from various heat sources such as the heat given off by the condensation of steam used to power conventional power plants, includes a tank of fluid operably positioned with respect to a source of heat so that fluid in the tank is heated. Such tank may be located so that it is immersed in cooling water from a conventional power plant or may be positioned to take advantage of solar heat or heat from any other source.

The fluid in the tank is chosen so that it becomes pressurized below the temperature of the tank and flows from the tank to a turbine having a hollow central shaft with hollow vanes extending radially outwardly therefrom so that the fluid flows from the tank into the shaft and out of the vanes. The ends of the vanes are angled so that the pressure fluid leaving the vanes imparts a rotational movement to the vanes and shaft and causes the shaft to rotate.

A housing is provided about the turbine to collect the fluid flowing from the vanes of the turbine. Once collected, the fluid flows through a conditioning coil to be heated, if necessary, and then into a storage tank for the fluid. From the storage tank, the fluid is reintroduced into the heating tank to be recirculated. Electronic circuitry is preferably provided to control operation of the engine.

THE DRAWINGS

In the accompanying drawings, which illustrate an embodiment of the invention constituting the best mode presently contemplated of carrying out the invention in actual practice.

DETAILED DESCRIPTION OF THE ILLUSTRATED EMBODIMENT

Figure 1:
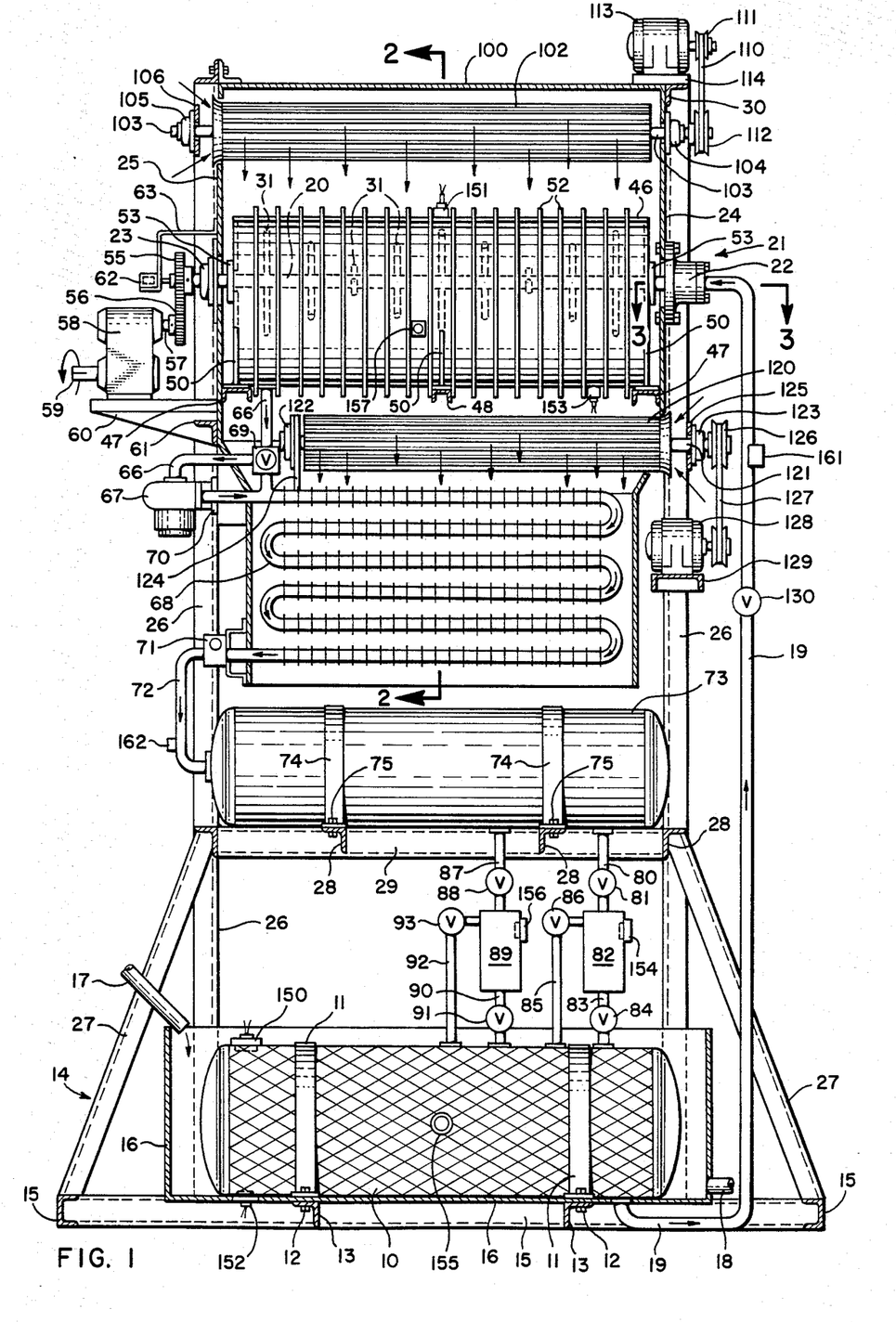
FIG. 1, is a vertical section of a motor of the invention showing most of the motor in elevation.
Figures 2, 3, 7:
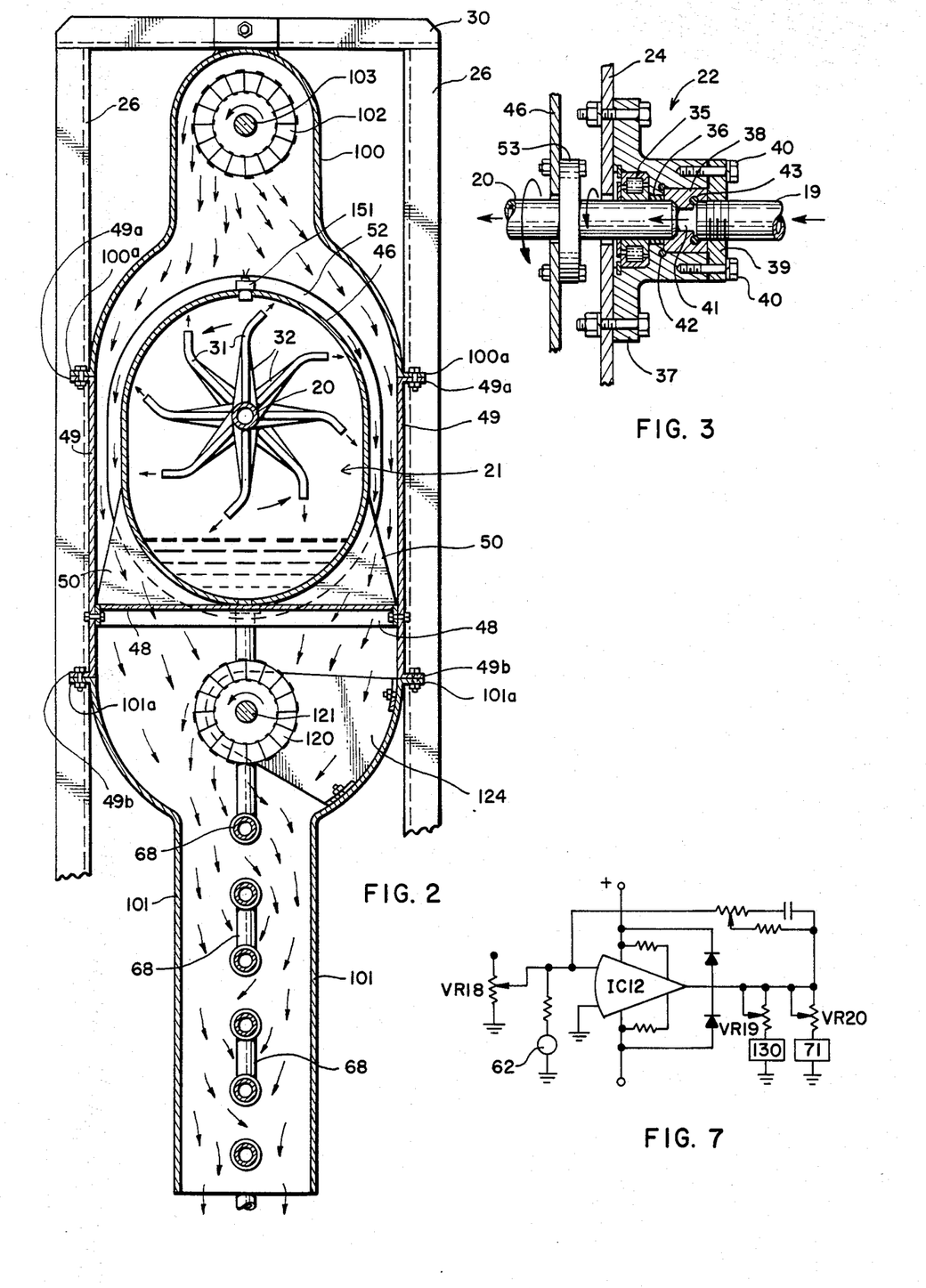
FIG. 2, a fragmentary vertical section taken on the line 2—2 of FIG. 1.
FIG. 3, a fragmentary horizontal section taken on the line 3—3 of FIG. 1.
FIG. 7, a circuit diagram of a control circuit for controlling the flow of fluid into and out of the turbine.

As shown in FIGS. 1 and 2, the various components of the motor may be conveniently arranged in vertical fashion to take advantage of gravity flow of fluid from the turbine to the heating tank. Thus, heating tank 10 is secured by tank straps 11 and bolts 12 to angle irons 13 which form part of the base 14 of the support structure for the motor. Channels 15 are secured together, such as by welding, to form a rectangular base with angle irons 13 secured thereto. An open tank 16 is mounted on base 14 on angle irons 13 and surrounds heating tank 10. A conduit 17 discharges heated fluid from a source of heated fluid, not shown, such as the waste cooling water from a steam cooling tower, into tank 16 where it surrounds heating tank 10. A drain 18 from tank 16 is also provided to drain fluid from the tank to keep it from overflowing and to maintain circulation of water in the tank. As the water moves through tank 16, heat is transfered to heating tank 10. Heating tank 10 is preferably made of a strong, good heat conducting material such as steel which is wire wrapped to provide additional strength.

A pipe 19 runs between heating tank 10 and the hollow shaft 20 of a turbine indicated generally at 21. Shaft 20 is mounted for rotation in bearings 22 and 23 supported by plates 24 and 25 extending between pairs of upright channels 26 which are secured to and extend upwardly from base channels 15. Braces 27, horizontal angle irons 28, and horizontal channels 29, FIG. 1, and top channels 30, FIG. 2, are provided to add additional stability to uprights 26 and make the supporting structure and base a strong, rigid unit. Hollow vanes 31 are spaced about and extend radially outwardly from shaft 20 along an intermediate portion of its length. Vanes 31 may take the form of cap tubes or may be larger tubes having nozzles at the end. In either case, as shown in FIG. 2, the ends of vanes 31 are angled away from the radius such as at a 45° angle. Fins 32 add additional strength and serve as bracing for vanes 31. While the vanes are shown as being staggered along the length of shaft 20, and such staggering is preferred, such staggering could be to a greater or lesser degree than that shown. Further, more than two vanes could be provided at any position along the length of the shaft, or all vanes could be located at one longitudinal position along the shaft. The positioning of the vanes should be symetrical so that shaft 20 is balanced.

Since fluid flows from heating tank 10 through pipe 19 into shaft 20 and then out vanes 31, the mounting of shaft 20 in bearing 22 must not only provide for rotation of shaft 20, but also provide fluid communication between stationary pipe 19 and rotating shaft 20 and provide a fluid seal to the atmosphere. Such mounting may be accomplished in any known manner. As shown in FIG. 3, shaft 20 is mounted in roller bearing 35 and extends through seal 36 in bearing mounting housing 37. An insert 38 is held in bearing mounting housing 37 by end plate 39 secured to housing 37 by screws 40 so that it fits about the end of shaft 20 as shown. Passage 41 communicates with the internal hollow passage of shaft 20. An O-ring 42 provides a seal for insert 38. Pipe 19 is threaded into end plate 39 and seats against O-ring 43.

A closed housing 46 is provided about turbine 21 to collect fluid flowing from the vanes 31 of the turbine. The housing 46 is supported on channels 47 extending between pairs of upright supports 26, and a similar center channel 48 secured to plates 49, FIG. 2, which extend between uprights 26 transversely to channels 47. Contoured braces 50 add further support and stability to housing 46. Fins 52 are provided about the outside of housing 46 to facilitate heat transfer. Seals 53 are provided at either end of housing 46 where shaft 20 passes therethrough, to prevent fluid leakage.

A gear 55 is mounted on the end of turbine shaft 20 that extends through bearing 23. Gear 55 meshes with gear 56 secured to the input shaft 57 of an enclosed speed reduction gear train 58 so that the speed of rotation of output shaft 59 is reduced a desired amount over the speed of rotation of input shaft 57. Gears 55 and 56 may also provide some speed reduction between turbine shaft 20 and input shaft 57. The speed reduction is preferably provided because turbine 21 can be designed to rotate at high speeds such as 10,000 rpm or higher and, through the speed reduction, the power and torque of output shaft 59 is substantially increased and the lower speed is still sufficient to power an electrical generator. The amount of speed reduction will depend upon the desired operating speed of the turbine and the desired speed of rotation for the generator powered by the turbine. In most cases a reduction of 30 to 1 is satisfactory. Shaft 59 is the power output shaft of the engine and is connected in any suitable manner to any device to be powered by the engine. Such device will generally be an electrical generator so that electrical power is produced by the engine.

Speed reducing gear train 58 is secured to and supported by mounting bracket 60. Angle iron 61 adds further strength and rigidity to the supporting structure. A tachometer 62 is mounted on bracket 63 and is positioned to measure the speed of rotation of turbine shaft 20.

Pipe 66 leads from the bottom of housing 46 to pump 67 which pumps both liquid and gaseous fluid from turbine housing 46 and acts as a compressor to compress gaseous fluid and liquefy it. The fluid is discharged from pump 67 into conditioning coil 68. A bypass valve 69 in pipe 66 provides for direct flow of fluid from turbine housing 66 into conditioning coil 68, bypassing pump 67. Pump 67 is mounted on the supporting frame in any suitable manner such as by a bracket 70 secured to one of the uprights 26. A valve 71 controls flow of fluid from the conditioning coil into pipe 72 which connects to fluid storage tank 73. Tank 73 is secured by tank straps 74 and bolts 75 to two of the angle irons 28 as shown in FIG. 1.

Pipe 80 with valve 81 leads from the bottom of storage tank 73 into a smaller pressure equilization tank 82 from which pipe 83 with valve 84 leads directly into heating tank 10. A pipe 85 with valve 86 therein connects the top of heating tank 10 and the top of pressure equilization tank 82. In similar fashion, a pipe 87 and valve 88 lead from storage tank 73 to a second pressure equilization tank 89 which is connected through pipe 90 and valve 91 to heating tank 10. Pipe 92 and valve 93 connect the top of heating tank 10 to the top of the second pressure equilization tank 89. Additional pressure equilization tanks and similar associated piping and valving can be added if necessary.

In order to provide warming for turbine housing 46, turbine 21 therein, and conditioning coil 68, a further housing is provided enclosing the turbine housing and conditioning coil. Thus, plates 24 and 25, which extend between pairs of uprights 26 and support turbine 21, extend inwardly and downwardly at their lower end as shown in FIG. 1, to below the bottom of conditioning coil 68. As shown in FIG. 2, a series of contoured walls comprising a top section 100, opposite middle sections 49, and opposite lower sections 101 extend between the end plates 24 and 25 to form the housing. Middle section plates 49 are secured between pairs of uprights 26 and have flanges 49a and 49b at their upper and lower edges, respectively. Top section 100 has flanges 100a at opposite lower edges which are bolted to upper flanges 49a of plates 49. Each lower section 101 has a flange at its upper edge which is bolted to lower flanges 49b of plates 49. An elongate blower 102 of squirrel cage configuration is mounted for rotation on shaft 103 which is supported at one end in bearing 104 secured to plate 24 and at the other end in bearing 105 supported by mounting bracket 106 secured to an upright 26. Plate 25 is open about shaft 103 so that air from the atmosphere can be drawn into the blower along shaft 103 and then expelled outwardly therefrom as indicated by the arrows in FIGS. 1 and 2. The configuration of top cover 100 directs the air from the blower downwardly about turbine housing 46. The blower is powered through belt 110 and pulleys 111 and 112 by a motor 113 mounted on bracket 114 secured to a top cross channel 30.

A similar blower 120 is mounted below turbine housing 46 on shaft 121 which is supported by bearings 122 and 123. Bearing 122 is mounted on bracket 124 secured to a lower housing plate 101, while bearing 123 is mounted on a bracket 125 secured to an upright 26. Plate 24 is open about blower 120 so that air can enter the blower along shaft 121 and be blown outwardly. Because of the configuration of the housing and the lower open end thereof, the air blown out by blower 120 will flow downwardly about conditioning coil 68. A pulley 126 mounted on shaft 121 is connected by belt 127, to motor 128, which powers the blower. Motor 128 is mounted on bracket 129 which is secured to an upright 26.

In operation, the fluid in heating tank 10 is heated and pressurized by the warm water surrounding and flowing about such tank. The temperature of cooling tower water from a typical steam powered generating plant is between about 150° and 170° F. Thus, the fluid in tank 10 is heated to about this temperature. By using a low boiling point refrigerant material such as F-22 refrigerant as the fluid, when the fluid in tank 10 is heated it becomes pressurized and flows through pipe 19 to turbine 21. The boiling point of F-22 is about 72° F. With refrigerant F-22 as fluid, a pressure of between about 250–400 psi will exist in tank 10 if the fluid reaches a temperature of between about 150° and 170° F. A flow control valve 130 can be used to control flow of fluid to the turbine. The fluid enters the shaft 20 of the turbine and flows under pressure through vanes 31. Since the fluid is under pressure as it is expelled from the ends of vanes 31, and since the ends of vanes 31 are angled, the fluid flowing from the vanes will be in the form of high pressure streams which will cause the turbine to rotate. As the speed of rotation increases, the pressure of the fluid flowing through the vanes will be further increased because of the centrifugal force exerted on it. This increased force will increase the power of the turbine.

As the pressurized refrigerant is expelled from vanes 31, it will immediately expand, absorb heat, and turn to a gas. This creates a refrigeration effect which will greatly reduce the temperature and pressure within the turbine. The reduction in pressure will increase the effective pressure with which the fluid is expelled from the vanes and the reduction in temperature will tend to cause at least some of the refrigerant to again liquify and collect in the bottom of housing 46. Pump 67, if operating, will draw both fluid and gaseous refrigerant from housing 46 and pump it through conditioning coil 68 where substantially all of the gaseous refrigerant will be liquified. This refrigerant will then collect in storage tank 73. If bypass valve 69 is open and pump 67 off, the refrigerant from housing 46 will flow by gravity through cooling coil 68 into tank 73.

It should be noted that the expansion of the refrigerant when expelled from the turbine will generally always be sufficient to cool the area inside the turbine housing to well below the boiling point of the refrigerant so that most of the fluid will again liquify in the turbine housing. Also, while the pressure inside the turbine housing will be less than the pressure of the fluid being supplied to the turbine, it will still generally be higher than atmospheric pressure. The pressure differential between the fluid supplied to the turbine and the turbine housing will determine the velocity with which the fluid flows from the turbine vanes. Usually pump 67 will only be required during start-up of the engine.

While substantial cooling in the turbine is desired, the cooling could reach a point where it is too cold for satisfactory operation. Thus, blower 102 is provided to draw air in from the atmosphere and blow it about the turbine housing 46 to warm it. The air is also blown about conditioning coil 68 so as to further warm the refrigerant flowing therethrough. If additional warming of the fluid in conditioning coil 68 is needed, or it is desired to warm that fluid apart from turbine 21, blower 120 is operated to blow warming air about conditioning coil 68.

Because the fluid in storage tank 23 is under substantially less pressure than the fluid in heating tank 10, fluid from the storage tank must have its pressure equalized before it can be introduced into the heating tank. Further, since the fluid in the storage tank is at a much lower temperature than the fluid in the heating tank and it is not desirable to unduly cool the fluid in the heating tank which would cause a reduction in pressure, the fluid must be introduced into the heating tank at a controlled rate. For this purpose, valves 84 and 86 are closed when valve 81 is open to allow fluid from the fluid storage tank 73 to flow through pipe 80 into pressure equalization tank 82. When the fluid in tank 82 approaches the level of pipe 85 into the tank, valve 81 is closed to stop further fluid flow into tank 81. Valve 86 is then opened so that the pressure in tank 82 is equalized with the pressure in heating tank 10. Valve 84 is also opened to allow the fluid in tank 82 to flow into tank 10 to be heated and be recirculated through the turbine. The size of tank 82 is such that the amount of fluid therein, when emptied into tank 10, will not substantially reduce the temperature or pressure of the fluid already in the tank. With tank 82 empty, valves 84 and 86 close and valve 81 opens to again fill tank 82 with fluid from storage tank 73.

The amount of fluid introduced into heating tank 10 at any time (the fluid capacity of tank 82) and the frequency of introduction will depend upon the amount of heat available for heating the fluid in tank 10 and the actual temperature of the fluid in tank 10. Thus, where a lot of heat is available to heat the fluid in tank 10 and its temperature is high, more fluid from the storage tank can be introduced into heating tank 10 than when less heat is available. However, the filling and emptying of tank 82 takes some time. It is therefore preferred to increase fluid flow into heating tank 10 by providing additional pressure equalization tanks such as tank 89 so that as tank 82 is emptying into heating tank 10, pressure equalization tank 89 can be filling with fluid from storage tank 73 and, as tank 89 is emptying its fluid into heating tank 10, tank 82 is filling with fluid from storage tank 73. Additional pressure equalization tank stages may be added as needed to supply a desired amount of flow of fluid from storage tank 73 into heating tank 10.

While the operation of the engine and valves associated therewith may be preset or may be manually controlled and adjusted, it is preferred that the operation of the engine be continuously monitored and automatically controlled to operate at maximum or other desired output taking all operating parameters into account. For this purpose, electronic control circuits and electrical sensors are provided.

Figures 4, 5, 6:
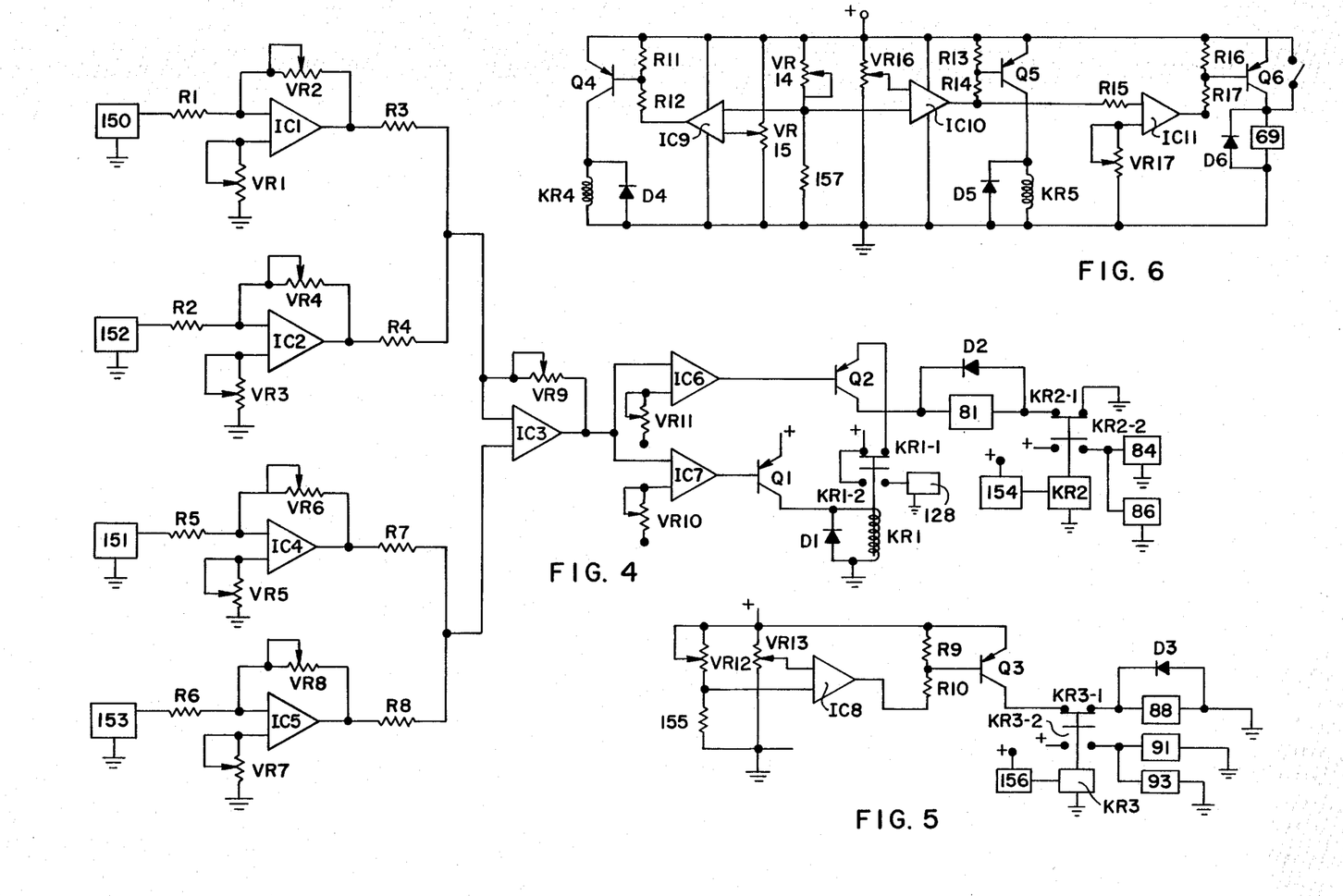
FIG. 4, a circuit diagram of a control circuit for controlling the flow of cooled fluid back into the heating tank of the engine.
FIG. 5, a circuit diagram of a second control circuit for controlling additional flow of cooled fluid back into the heating tank of the engine when increased flow of such fluid is necessary.
FIG. 6, a circuit diagram of a control circuit for controlling the heating and cooling fans and the compressor.

FIG. 4 shows circuitry which can be used to control the flow of fluid from storage tank 73 through pressure equalization tank 82 into heating tank 10. Since the amount and frequency of fluid added to heating tank 10 affects the pressure and temperature of the fluid in tank 10 and since the temperature and pressure in tank 10 affects the temperature and pressure in the turbine and affects the operation of the turbine, variables that must be considered in such control are the pressure and temperature of the fluid in heating tank 10 and the pressure and temperature in turbine 21. In order to measure pressure, a pressure sensor 150 is mounted in any suitable manner in the top of heating tank 10 and a pressure sensor 151 is mounted in the top of turbine housing 46. Such sensors may be of common type which change resistance with pressure so produce electrical signals representative of the pressure in tank 10 and the pressure in turbine housing 46. To measure temperature, thermistor 152 is mounted in the fluid at the bottom of tank 10 and thermistor 153 is mounted in the fluid at the bottom of turbine housing 46. These thermistors change resistance with temperature change and thus produce electrical signals representative of the temperature in tank 10 and the temperature in turbine housing 46.

Pressure sensor 150 is connected through resistor R1 to the inverting input of operational amplifier IC1. The other input of IC1 is connected through variable resistor VR1 to ground. By varying VR1, the zero point of IC1 is changed, i.e., IC1 can be adjusted so that its output will be zero for any desired input from sensor 150. Variable resistor VR2 sets the gain of IC1. Temperature sensor 152 is connected through resistor R2 to the inverting input of IC2. The other input of IC2 is connected through variable resistor VR3 to ground and adjusts the zero of IC2. Variable resistor VR4 sets the gain of IC2. The output of IC1 passes through resistor R3 and is summed at the inverting input of operational amplifier IC3 with the output of IC2 which has passed through resistor R4. The signal from IC1 is representative of the pressure in heating tank 10 while the signal from IC2 is representative of the temperature in tank 10. By adjusting the zero points of IC1 and IC2 and the gain of IC1 and IC2, the input on IC3, which is the sum of the outputs of IC1 and IC2, can be made to represent any desired relationship between pressure and temperature in tank 10.

Similarly, with turbine housing 46, pressure sensor 151 is connected through resistor R5 to the inverting input of IC4. The other input of IC4 is connected through variable resistor VR5 to ground. VR5 adjusts the zero of IC4. The gain of IC4 is set by variable resistor VR6. Temperature sensor 153 is connected through resistor R6 to the inverting input of IC5 while the other input of IC5 is connected to ground through variable resistor VR7. Again, VR7 adjusts the zero of IC5. Variable resistor VR8 adjusts the gain of IC5. The outputs of IC4 and IC5 pass through resistors R7 and R8, respectively, and are summed at the noninverting input to IC3. Any desired relationship between the pressure and temperature in the turbine housing 46 can be obtained by setting the zeros and gains of IC4 and IC5.

IC3 acts as a differential amplifier whose output is proportional to the difference in the summed outputs of IC1 and IC2 and IC3 and IC4. The gain of IC3 is set by variable resistor VR9.

The output of IC3, which represents the desired relationship between pressure and temperature in heating tank 10 and turbine housing 46, is connected to the inverting inputs of both IC6 and IC7. The other input of IC7 is connected to variable resistor VR10 which, by setting the zero of IC7, sets a low reference value for the circuit. When the output of IC3 is below the low reference value, IC7 produces an output which turns transistor Q1 on to energize relay coil KR1 and open relay contacts KR1-1. As long as the output of IC3 is above the low reference value, IC7 produces an output which turns transistor Q1 off. Relay contacts KR1-1 remain closed. Diode D1 protects transistor Q1 by dissipating the back emf generated when the relay is turned off. The other input of IC6 is connected to variable resistor VR11 which, by setting the zero of IC6, sets a high reference value for the circuit. When the output of IC3 is below the high reference value, IC6 produces an output signal which turns transistor Q2 off. When the output of IC3 is above the high reference value, IC6 produces an output signal which turns transistor Q2 on to supply power to valve 81 to cause it to open. The power for valve 81 comes from the positive source voltage through relay contacts KR1-1, through transistor Q2 to valve 81, and then through relay contacts KR2-1 to ground. Diode D2 is provided to dissipate the back emf generated when the solenoid that operates valve 81 is turned off. A liquid level switch 154 is provided in tank 82 to indicate when fluid in tank 82 reaches a desired full level. This level sensor 154 may be of any known type, such as a float switch, and is connected to operate an associated time delay KR2, such as an adjustable time delay relay made by Cutler-Hammer, when the fluid level reaches the sensor. When the fluid level reaches sensor 154 in tank 82, relay KR2 is activated and relay contacts KR2-1 are opened disconnecting valve 81, thereby closing it, and relay contacts KR2-2 close connecting valves 84 and 86 to the positive supply voltage causing them to open. This allows equalization of the pressure in tank 82 and allows the fluid to flow through pipe 83 into tank 10. The time delay of the relay is set so that it remains closed for a time generally sufficient for the fluid in pressure equalization tank 82 to drain into heating tank 10. After the set time delay, relay KR2 is deactivated and relay contacts KR2-2 open to close valves 84 and 86 and relay contacts KR2-1 close to open valve 81 so pressure equalization tank 82 again fills with fluid. The cycle repeats itself as long as transistors Q1 and Q2 remain on. As will be understood from the description of the circuitry of FIG. 4, no fluid flows from the storage tank, through the pressure equilization tank, into the heating tank for recirculation until the high reference value is reached. The purpose of the low reference value is merely to ensure that no fluid flow occurs when the value of the output of IC3 drops below the low reference value. This is essentially a back-up shut off because, in most instances, the flow will already have been shut off due to the signal from IC3 dropping below the high reference value.

When a second stage pressure equalization tank 89, or additional stage pressure equalization tanks are used, each tank and associated valves require circuitry as shown in FIG. 5 for control. With this circuitry, a second thermistor 155 is located in heating tank 10 and forms a voltage divider with varible resistor VR12. The voltage from the center point of the divider i.e., between VR12 and 155, is connected to the noninverting input of operational amplifier IC8. The inverting input of IC8 is connected to variable resistor VR13. Variable resistors VR12 and VR13 are set so that when the thermistor indicates a temperature above a certain maximum temperature, such temperature meaning that additional fluid from storage tank 73 should be introduced into tank 10, a signal is produced at the output of IC8 which gives a voltage difference between such output signal and the positive supply voltage sufficient to produce a voltage on the base of transistor Q3 to turn it on. Resistors R9 and R10 provide a voltage divider to supply a voltage to the base of transistor Q3 and also limit current flow between the positive source and the output of IC8. With transistor Q3 on, power is connected through transistor Q3 and relay contacts KR3-1 to valve 88. This causes valve 88 to open and allow tank 89 to fill with fluid. When the fluid level reaches fluid sensor 156, similar to fluid sensor 154 already discussed, time delay relay KR3, similar to relay KR2, is activated. This causes relay contacts KR3-1 to open thereby disconnecting valve 88 and causing it to close, and contacts KR3-2 to close thereby connecting valves 91 and 93 to the positive supply voltage causing them to open and allow the fluid in tank 89 to flow into heating tank 10. After the predetermined time delay, relay KR3 again opens to start filling pressure equalization tank 89. This cycle repeats itself as long as the temperature indicated by thermistor 155 is above the preset minimum. Diode D3 across valve 81 is provided to protect transistor Q3 by dissipating any back emf generated by the solenoid coil of valve 88 when the power is disconnected.

When several additional stages are used, the circuit for each will be adjusted to operate at a slightly higher temperature. Thus, as the temperature in heating tank 10 rises and stays above certain minimums, the additional stages will begin and maintain operation. As temperature decreases, the additional stages will cease operation.

While time delay relays have been used where indicated in the circuits of FIGS. 4 and 5, other means of maintaining operation of the relay while the pressure equalization tanks drain could be used. Such other means could be sensors located in the tanks to determine when the tanks have been drained along with associated circuitry to control operation of the relay.

The control for pump 67 and the control for blower 102 above turbine housing 46 is dependant upon the temperature inside turbine housing 46. When the temperature is above a desired maximum temperature, pump 67 must be activated to pump fluid from the housing, reduce the pressure in the housing, and compress the fluid and pump it through conditioning coil 68 into tank 73. If the temperature is within a desired range, the pump need not operate as the fluid will merely flow by gravity through the cooling coils. If the temperature is below a desired minimum, the turbine needs to be warmed and blower 102 is operated to pass warming air about turbine housing 46.

To monitor the temperature in the turbine housing, a second thermistor 157 is placed within turbine housing 46. This thermistor forms a voltage divider with variable resistor VR14. The point on the voltage divider between variable resistor VR14 and thermistor 157 is connected to the inverting input of operational amplifier IC9. The other input of IC9 is connected to variable resistor VR15. As the temperature in the turbine changes, causing the resistance of thermistor 157 to change, the input signal to IC9 from the voltage divider changes. VR15 is adjusted so when the signal from the voltage divider indicates a temperature below the desired minimum, IC9 produces an output signal to give a voltage difference across the voltage divider made up of resistors R11 and R12 to turn on transister Q4. The base of transistor Q4 is connected to the voltage divider between resistors R11 and R12 and resistors R11 and R12 limit current flow between the positive supply and the output of IC9. When transistor Q4 is turned on, relay coil KR4 is energized to turn on blower motor 113 through a set of relay contacts, not shown. The connection of such relay contacts to blower motor 113 would be obvious to one skilled in the art. Diode D4 protects transistor Q4 by dissipating the back emf generated when relay KR4 is deenergized.

The signal from the voltage divider made up of VR14 and thermistor 157 is also connected to the noninverting input of operational amplifier IC10. The other input of IC10 is connected to variable resistor VR16. VR16 is adjusted so when the signal from the voltage divider indicates a temperature above the desired maximum, IC10 produces an output signal to give a voltage difference across the voltage divider made up of resistors R13 and R14 to turn on transistor Q5. The base of transistor Q5 is connected to the voltage divider between resistors R13 and R14 and resistors R13 and R14 limit current flow between the positive supply and the output of IC10. When transistor Q5 is turned on, relay coil KR5 is energized to turn on pump 67 through a set of relay contacts, not shown. Diode D5 protects transistor Q5 by dissipating the back emf generated when relay KR5 is deenergized.

Since the bypass valve 69 should be closed when pump 67 is operating, and open otherwise, the output of IC10 which causes operation of pump 67 is connected through resistor R15 to the inverting input of operational amplifier IC11. The other input of IC11 is connected to ground through variable resistor VR17. VR17 is set so that without an output on IC10 sufficient to activate pump 67, IC11 produces an output signal to give a voltage difference across the voltage divider made up of resistors R16 and R17 to turn on transistor Q6. The base of transistor Q6 is connected to the voltage divider between resistors R16 and R17 and resistors R16 and R17 limit current flow between the positive supply and the output of IC11. When transistor Q5 is turned on, vlave 69 is energized to open the bypass of pump 67 and allow fluid to flow directly from turbine housing 46 to conditioning coil 68. Diode D6 protects transistor Q6 by dissipating the back emf generated when the solenoid operated valve 69 is deenergized. When an output appears on IC10 sufficient to turn on transistor Q5, the output of IC11 becomes such that transistor Q6 is turned off, thereby deenergizing valve 69 and connecting pump 67 to pipe 66. A manually operated switch SW1 is provided so that bypass valve 69 can be manually activated if desired.

In order to set this circuitry, the thermistor 157 should be subjected to the average desired normal operating temperature of the turbine. Variable resistor VR14 is then set to drop about one-half the voltage. The temperature of the thermistor is then increased to the high temperature where the pump should begin operation. Variable resistor VR16 is now set to just activate relay KR5, the variable resistor VR17 is set to just deactivate valve 69. The temperature of thermistor 157 is now reduced to the low temperature where it is desired that blower 102 start operation. Variable resistor VR15 is not adjusted to just activate relay KR4.

In the circuitry discussed so far, various operational amplifiers and transistors may be used. All operational amplifiers may be of 741 type except IC3 which is preferably an LM3900. The transistors may be all 2N3702's. The diodes may all be 1N4001's.

In most instances it will be desirable to control the speed of rotation of turbine 21. One way to control the speed of rotation is to control the flow of fluid into the turbine. Valve 130 in pipe 19 between heating tank 10 and turbine 21 is a flow control valve rather than merely an open or closed valve. The operation of the valve is controlled by monitoring the actural RPM's of the turbine with tachometer 62 using the circuitry shown in FIG. 7. FIG. 7 shows the standard circuitry as designed by Burr-Brown and shown in their application notes for the 3572 operational amplifier when used as a speed control in conjunction with a tachometer. A reference voltage is provided by variable resistor VR18 which is summed with the voltage generated by tachometer 62 which is representative of the speed of rotation of the turbine. This sum is connected to an input of the Burr-Brown operational amplifier IC12. Since this is standard circuitry it will not be described in detail. The output of IC12 is connected through variable resistor VR19 to valve 130 to control the amount of fluid flow to the turbine. The valve reduces fluid flow to slow down the turbine and increases fluid flow to speed up the turbine. The output of IC12 is also connected through variable resistor VR20 to control valve 71 which controls flow of fluid from conditioning coil 68 to storage tank 73. Valve 71 can control back pressure in coil 68 and turbine 21 which also is a factor in the control of the speed of turbine 21. By adjusting variable resistors VR19 and VR20, any relationship between relative opening and closing of valves 130 and 71 may be obtained.

The temperature of the fluid in conditioning coil 68 affects the pressure of the fluid in such coil and also has a substantial effect on the back pressure in turbine housing 46, an also on the temperature of the fluid in storage tank 73 which is introduced for recirculation into heating tank 10. Thus, blower 120 is controlled to supply heat when needed to conditioning coil 68. As mentioned, under normal conditions of operation, the temperature of the fluid in the turbine housing 46 and conditioning coil 68 will be well below the boiling point of the fluid used and, except in cold atmospheric conditions, will be substantially below atmospheric temperature. Thus, blowing atmospheric air over the conditioning coils will heat them and the fluid therein. This additional heating will usually be desired when temperature in the system drops too much and flow of fluid for recirculation stops. Thus, in the circuitry of FIG. 4, when the desired pressure and temperature relationships in heating tank 10 and turbine housing 46 fall below the predetermined minimum as set by the low reference value in IC7, blower 120 should be turned on. Thus, relay KR1 is provided with a second set of relay contacts KR1-2 which close when the output of IC3 drops below the low reference value as set by VR10 for IC7. These relay contacts are set to operate motor 128 powering blower 120 in a manner which would be obvious to one skilled in the art. If the atmospheric temperature is such that heating cannot be provided by the air, a heat source could be provided for the purposes of heating.

Generally, the capability to return fluid to the heat tank from the turbine should be greater than the flow capacity to the turbine. Otherwise, a condition could arise where all of the fluid would back up into the turbine.

Also, as indicated from the above description, the important variables to control in the operation of the engine are the flow rate of the fluid into the turbine and through the system, and the pressure and temperature difference between the fluid flowing into the turbine, and the turbine housing. Thus, at any given RPM and load on the engine, a constant pressure and temperature differential across the turbine should ideally exist as well as a constant flow volume of fluid through the system.

In order to recharge the system with refrigerant if and when necessary, shrader ports 161 and 162 are provided in fluid lines 19 and 72 respectively.

While the heat source for heating tank 10 has been described as cooling water from a steam condensing tower, it should be realized that various heat sources could be used to heat tank 10. Thus, solar heat concentrators could be arranged to supply heat to tank 10, waste gas from oil refining or oil wells could be used to create a flame under tank 10, or any other source of heat could be used. The advantage of the engine is that very high temperatures are not necessary to run the engine. The engine can be operated at much lower temperatures than described above by using fluids with lower boiling points. For example, F-12 refrigerant with a boiling point of 32° F. could be used where a lower temperature heat source is available. The engine can also be run at higher temperatures if desired and the heat is available. The fluid used in the engine will vary depending upon the temperatures used.

Also, while it has been indicated that heating of the fluid generally takes place in the conditioning coil, in some rare instances it may be necessary or desireable for cooling to take place. Therefore, this coil is provided for conditioning the fluid by heating or cooling, when necessary.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. An engine powered by a source of heat, comprising a heating tank operatively positioned with respect to a source of heat so that the contents of the tank is heated; a working fluid within the tank, such fluid having a boiling point below the temperature of the source of heat so that when the fluid is heated in the tank, it becomes pressurized; a turbine having a hollow central shaft mounted for rotation and adapted to receive pressurized fluid from the tank and a plurality of hollow vanes extending radially outwardly from the central shaft, said hollows of the vanes communicating with the hollow of the shaft and being open at their opposite ends so that said pressurized fluid flows from the shaft through the vanes and out the ends of the vanes, the openings at the ends of the vanes directing said fluid from the vanes to cause rotational movement of the vanes and shaft; a housing about the turbine to collect and confine the fluid flowing from the turbine; storage means for storing the collected fluid; means for connecting the turbine housing and storage means so said fluid can flow from the turbine housing into the storage means; at least one pressure equalization tank in flow communication with both the storage means and the heating tank; first valve means to control the flow of fluid from the storage means into the pressure equalization tank; second valve means to control the flow of fluid from the pressure equalization tank into the heating tank; equalizing means connecting the top of the heating tank and the top of the pressure equalization tank to allow for pressure equalization between the two tanks; and third valve means in the equalizing means to control when pressure equalization takes place so that the fluid in the storage tank can flow into the equalizing tank, be pressure equalized, and flow into the heating tank to be again heated and circulated through the system.

2. An engine according to claim 1, wherein the connecting means is a conditioning coil.

3. An engine according to claim 2, wherein there is additionally included a pump for pumping the fluid from the turbine housing through the conditioning coil.

4. An engine according to claim 3, wherein the pump also compresses gaseous portions of the fluid.

5. An engine according to claim 1, wherein there is additionally included a pump for pumping the fluid from the turbine housing through the connecting means into the storage means.

6. An engine according to claim 5, wherein there is additionally included a bypass valve connected so that when the bypass valve is closed, the pump is connected between the turbine housing and the connecting means and with the bypass valve open the pump is bypassed and fluid flows directly from the turbine housing into the connecting means.

7. An engine according to claim 6, wherein the bypass valve and pump is controlled by electronic circuitry which monitors the temperature in the turbine housing and operates the bypass valve and pump in response to preset temperature conditions.

8. An engine according to claim 1, wherein means are provided to control operation of the valve means such that when the first valve means, controlling flow of fluid from the storage means to the pressure equalization tank, is open to allow fluid flow, the second valve means, controlling flow of fluid from the equalization tank to the heating tank, and the third valve means, controlling when pressure equalization takes place, are both closed, and when either or both of the second valve means, controlling flow of fluid from the equalization tank to the heating tank, and the third valve means, controlling when pressure equalization takes place, are open, the first valve means, controlling flow of fluid from the storage tank to the equalization tank, is closed.

9. An engine according to claim 8, wherein the means for controlling operation of the valves is electronic circuitry that monitors the temperature and pressure in the heating tank and the temperature and pressure in the turbine and operates the valves to introduce the heating stored fluid into the tank when preset conditions of pressure and temperature in the heating tank and turbine are met.

10. An engine according to claim 9, wherein the electronic circuitry includes an operational amplifier for each of the temperature and pressure variables monitored, each such amplifier having an adjustable zero output point in relation to the input variable, and means for combining the output of the operational amplifiers to produce a signal indicative of whether the present conditions of pressure and temperature are met.

11. An engine according to claim 10, wherein the means for combining the outputs of the operational amplifiers includes a summing network for summing the outputs representative of temperature and pressure in the tank, a summing network for summing the outputs representative of temperature and pressure in the turbine, and an operational amplifier connected to sum the outputs of the summing networks.

12. An engine according to claim 8, wherein more than one pressure equalization tank and associated valves are provided and wherein separate means are provided for controlling operation of each pressure equalization tank and associated valves.

13. An engine according to claim 12, wherein one of the separate means for controlling operation of a pressure equalization tank and associated valves is electronic circuitry that monitors the temperature and pressure in the heating tank and the temperature and pressure in the turbine and operates one of the pressure equalization tanks and associated valves to introduce the stored fluid into the heating tank when preset conditions of pressure and temperature in the heating tank and turbine are met, and the additional separate means for controlling operation of a pressure equalization tank and associated valves is electronic circuitry that monitors the temperature in the heating tank and operates additional pressure equalization tanks and associated valves when preset temperature conditions in the heating tank are met.

14. An engine according to claim 1, wherein the turbine vanes are cap tubes, and fluid flows from the ends of the tubes as high velocity streams.

15. An engine according to claim 1, wherein the turbine vanes include nozzles at their ends so that the fluid flows from the ends of the vanes as a high velocity stream.

16. An engine according to claim 1, wherein the ends of the vanes are configured so that the fluid flows therefrom at an angle of 45° from the axis of the vane.

17. An engine according to claim 1, additionally including a housing about the turbine housing and a blower to blow atomospheric warming air about the turbine when necessary to warm it.

18. An engine according to claim 17, wherein the connecting means is a conditioning coil and warming air from the blower also passes about the conditioning coil.

* * * * *